(12) United States Patent
Görg et al.

(10) Patent No.: US 9,062,638 B2
(45) Date of Patent: Jun. 23, 2015

(54) FILTER ELEMENT FOR FILTERING FLUIDS

(75) Inventors: Günter Görg, Möglingen (DE); Fabian Wagner, Möglingen (DE); Jürgen Rauschmaier, Ingelfingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 386 days.

(21) Appl. No.: 13/450,768

(22) Filed: Apr. 19, 2012

(65) Prior Publication Data
US 2012/0266578 A1  Oct. 25, 2012

(30) Foreign Application Priority Data

Apr. 20, 2011  (DE) .......................... 10 2011 018 366

(51) Int. Cl.
*B01D 46/24* (2006.01)
*F02M 35/024* (2006.01)
*F02M 35/04* (2006.01)
*F02M 37/22* (2006.01)

(52) U.S. Cl.
CPC ... *F02M 35/02483* (2013.01); *F02M 35/02425* (2013.01); *F02M 35/02466* (2013.01); *F02M 35/044* (2013.01); *F02M 37/22* (2013.01); *B01D 46/2411* (2013.01); *B01D 2265/06* (2013.01); *B01D 2279/60* (2013.01)

(58) Field of Classification Search
None
See application file for complete search history.

(56) References Cited

U.S. PATENT DOCUMENTS

| 3,272,336 | A | * | 9/1966 | Humbert, Jr. ................. 210/132 |
| 3,672,130 | A | * | 6/1972 | Sullivan et al. ................. 55/323 |
| 4,498,915 | A | | 2/1985 | Witchell |
| 4,865,738 | A | * | 9/1989 | Black et al. ................... 210/484 |
| 5,106,501 | A | | 4/1992 | Yang et al. |
| 6,599,342 | B2 | * | 7/2003 | Andress et al. ................. 55/495 |
| 8,273,143 | B2 | * | 9/2012 | Coulonvaux et al. ........... 55/344 |
| 2004/0261383 | A1 | * | 12/2004 | Schaerlund et al. ............ 55/498 |
| 2008/0190082 | A1 | * | 8/2008 | Scott et al. ...................... 55/520 |
| 2010/0037575 | A1 | | 2/2010 | Mouatt |

FOREIGN PATENT DOCUMENTS

| DE | 10230430 A1 | 1/2004 |
| DE | 102009048684 A1 | 4/2011 |
| WO | WO9946501 A1 | 9/1999 |
| WO | WO2010008110 A1 | 1/2010 |

OTHER PUBLICATIONS

Abstract DE102009048684, Dated Apr. 28, 2011.
Abstract DE10230430, Dated Jan. 22, 2004.

* cited by examiner

*Primary Examiner* — Duane Smith
*Assistant Examiner* — Phillip Shao
(74) *Attorney, Agent, or Firm* — James Hasselbeck

(57) ABSTRACT

A filter element for filtering fluids has a support tube having a circumferential wall provided with passages for a fluid. A hollow elongate filter medium is arranged axially on the support tube. The passages are adapted in regard to size; distribution; or size and distribution to a fluidic configuration of the filter element such that non-uniform fluid flows that exist in operation of the filter element upstream of the support tube are compensated. The filter element is used in particular in air filters for internal combustion engines.

11 Claims, 3 Drawing Sheets

FILTER ELEMENT FOR FILTERING FLUIDS

CROSS REFERENCE TO RELATED APPLICATIONS

This application claims the benefit under 35 USC 119 of foreign application 102011018366.3 filed in Germany on Apr. 20, 2011, and which is hereby incorporated by reference in its entirety.

TECHNICAL FIELD

The invention concerns a filter element for filtering fluids, in particular intake air of an internal combustion engine, in particular of a motor vehicle, comprising a hollow elongate filter medium that is arranged axially on a support tube that has a peripheral or circumferential wall provided with passages for the fluid. Moreover, the invention concerns an air filter of an internal combustion engine, in particular of a motor vehicle, comprising a housing in which a filter element for filtering intake air of the internal combustion engine is arranged that comprises a hollow elongate filter medium that is arranged axially on a support tube that has a peripheral or circumferential wall provided with passages for the fluid.

BACKGROUND OF THE INVENTION

WO 99/46501 discloses a device for filtering intake air of an internal combustion engine. The device comprises a housing that is closed by a cover. In the housing, a hollow-cylindrical filter element is arranged. The filter element is comprised of a zigzag-folded filter medium. The filter medium is arranged on a support body that is configured like a diffusor. One half of the support body is closed. The support tube tapers toward the center and the other half is provided with support rings for supporting the filter medium. Between the support rings there are passages for the intake air.

SUMMARY OF THE INVENTION

It is an object of the present invention to design a filter element and an air filter of the aforementioned kind in such a way that a fluid flow can be realized that is as uniform as possible. In particular, the outflow of the filtered fluid should be as uniform as possible.

In accordance with the present invention, this is achieved in that the passages are adapted in regard to size and/or distribution to a fluidic configuration of the filter element in such a way that non-uniform fluid flows that exist in operation of the filter element upstream of the support tube can be compensated.

According to the invention, the ratio of the passage surface area to the total surface area in axial direction and/or circumferential direction is designed such that non-uniform basic flows, in particular at the inflow side of the filter element, are compensated in order to achieve a flow through the filter element that is as uniform as possible. The passages can be adapted in size and/or distribution to the fluidic configuration of the filter element, in particular to shape, dimension and/or material of the filter medium and/or incoming flow of the filter medium. The terms axial, radial, and circumferential in the context of the invention relate to the extension of the support tube. The support tube can be advantageously straight. However, it can also be curved or bent. The inwardly positioned circumferential side of the filter medium in radial direction is partially covered in accordance with the invention by the support tube. The cover limits the volume flow of the fluid through the circumferential or peripheral wall of the support tube that flows through the filter medium from the exterior to the interior in radial direction or from the interior to the exterior.

The passages can be arranged and/or designed preferably with regard to optimization of the flow of the fluid through the filter element. Even in case of filters in which the inflow into the filter medium is non-uniform, the filter element according to the invention enables optimization of the flow in such a way that the incoming fluid to be filtered is distributed uniformly onto the filter medium. This has the advantage that the filter medium is loaded uniformly. The filter efficiency can be improved and/or the service life can be simply extended. Moreover, a drop or break-down of the separation efficiency of the filter element can be counteracted.

Moreover, with the support tube according to the invention the outflow of the filtered fluid at the clean side of the filter medium is optimized. In this way, a uniform inflow at a sensor that is arranged in the flow path downstream of the filter element, in particular an air mass meter, is enabled so that the measuring quality is improved. More precise measuring results have a positive effect on motor control of the internal combustion engine. In profile, the support tube and/or the filter medium can be round, oval, or angular. The support tube can also have a profile that varies across the length. The support tube can be cylindrical or can taper in a conical shape.

In an advantageous embodiment, the passages can be distributed almost across the entire axial extension of the support tube and a ratio of the total circumferential surface area of the passages relative to the total circumferential surface area of the wall surface that surrounds the passages and is impermeable to fluid can decrease from a first end toward a second end of the support tube. Advantageously, the passages can be designed and distributed across the entire length of the support tube in such a way that the fluid-permeable surface area of the circumferential wall of the support tube decreases in the corresponding axial direction. The radial inner circumferential side of the filter medium is partially covered increasingly by the support tube in the direction toward the second end. The decreasing fluid permeability of the circumferential wall along the support tube in the axial direction counteracts also local high inflow velocities, and this has a positive effect on filter loading.

In a further advantageous embodiment, the density and/or the size of the passages can decrease toward the second end of the support tube. The density in this context is the number of passages relative to the corresponding wall surface area. By decreasing the density and/or size of the passages, in a simple way the total circumferential fluid-permeable surface area can be decreased.

Advantageously, the total surface area of the passages can decrease in the flow direction of the fluid in the interior of the support tube. In this way, the uniformity of the flow in the interior of the support tube can be improved.

In a further advantageous embodiment, the support tube can have a support structure of a plurality of coaxial support rings that are connected to each other by means of axial support webs. The circumferential wall is defined by the support structure. In this context, the passages are located between the support rings and the axial support webs. A support structure can be realized in a simple way. The support structure can provide an optimal stability while, at the same time, an optimal fluid permeability of the circumferential wall is achieved. The support structure can be designed to be weight-optimized.

Advantageously, in the area of the second end of the support tube the openings between at least two neighboring support rings can be covered at least partially with a cover. By means of the cover the corresponding opening can be covered partially or entirely so that the surface area of one or several passages that are covered by the cover and thus the total circumferential surface area of the passages can be reduced accordingly. A cover can be mounted in a simple way, even retrofitted, on the support rings and/or the support webs. However, it can also be fastened monolithically on the support rings and/or the support webs. Moreover, advantageously also the openings between a third support ring, counted from the second end of the support tube, and at least a further support ring can be covered with a cover so that the passage of the filter medium and the course of the flow at the fluid discharge of the filter element can be further compensated.

In a further advantageous embodiment, at least one of the covers can have through openings in particular can be a perforated grid (hole screen). With appropriate arrangement and/or size of the through openings, the total circumferential surface area of the passages can be precisely predetermined. In this way, the flow course in the filter element can be improved. With the perforated grid or screen, a pressure loss that results from the reduction of the total circumferential surface area of the passages can be minimized.

Advantageously, in axial direction adjacent to each other at least two covers with passages can be arranged. In this way, covers in particular with different arrangement and/or configuration of through openings can be premanufactured for a modular system. They can be attached, as needed, to the support structure of the support tube.

For the air filter, the object of the present invention is solved in that the through passages are distributed almost across the entire axial extension of the support tube and a ratio of total circumferential surface area of the passages relative to the total circumferential surface area of the wall surface that surrounds the passages and is fluid-impermeable decreases toward the second end of the support tube. The aforementioned advantages and features of the filter element according to the invention apply to the air filter according to the invention in the same way.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
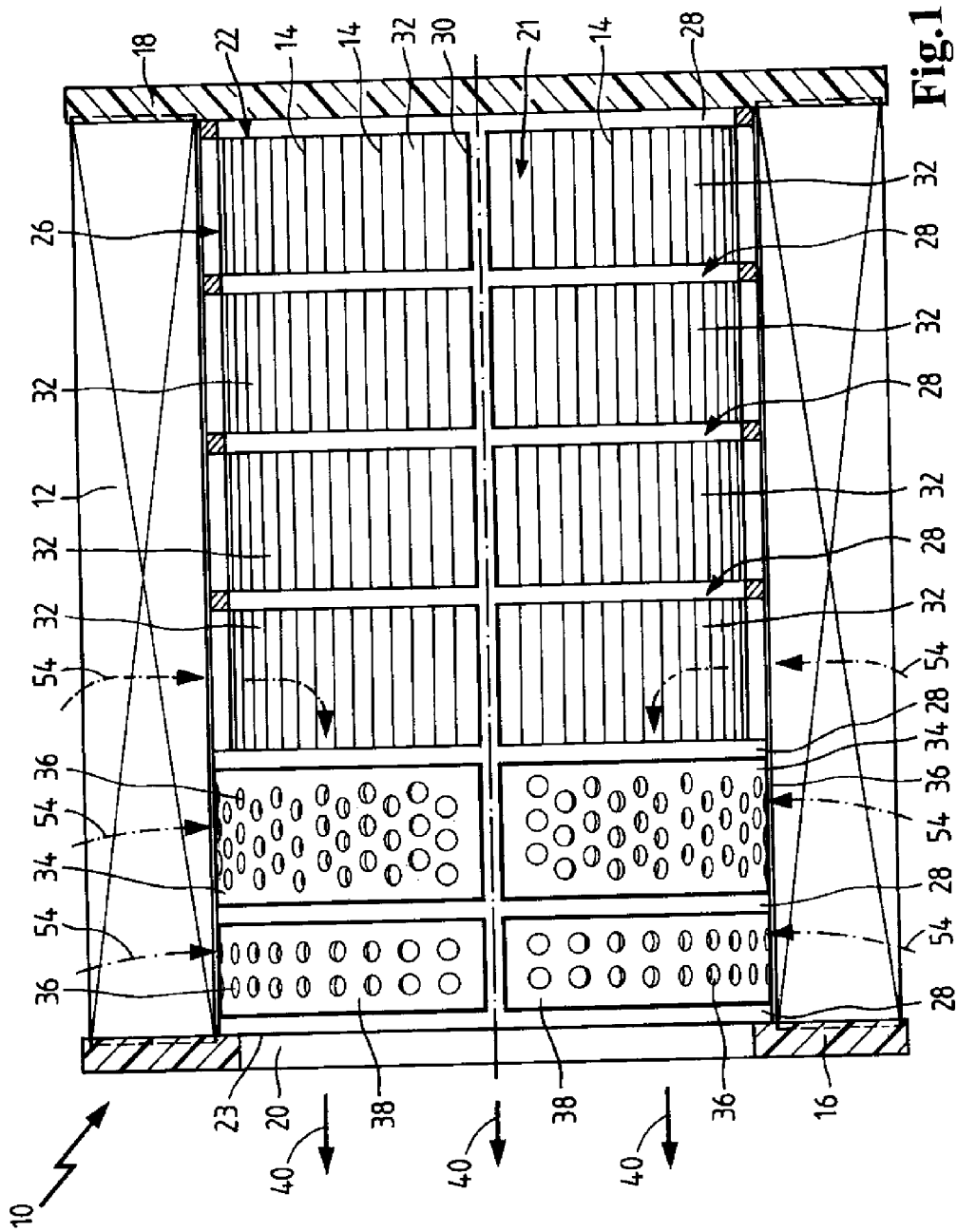
FIG. 1 shows a partial section view of a hollow-cylindrical filter element for filtering intake air of an internal combustion engine according to a first embodiment.

In the Figures, same components are identified with same reference characters. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter element for filtering fluids. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In FIG. 1, a partial section view of a first embodiment of a hollow cylindrical filter element 10 is illustrated. The filter element 10 serves for filtration of intake air of an internal combustion engine of a motor vehicle.

The filter element 10 is comprised of a zigzag-folded filter medium 12, for example, filter paper. To better understand the illustration, some fold edges 14 at the radial inner circumferential side of the filter medium 12 are shown in FIG. 1.

At the outlet end face, the filter medium 12 has an outlet end disk 16. On the opposite end face of the filter medium 12, a second end disk 18 is arranged. The outlet end disk 16 has an outlet opening 20 for the intake air (clean air); the outlet opening 20 is coaxial to the filter medium 12 and communicated with the interior 21 of the filter element 10. The second end disk 18 has no opening and closes off in this way the interior 21 at the end of the filter element 10 opposite the end disk 16.

Figure 2:
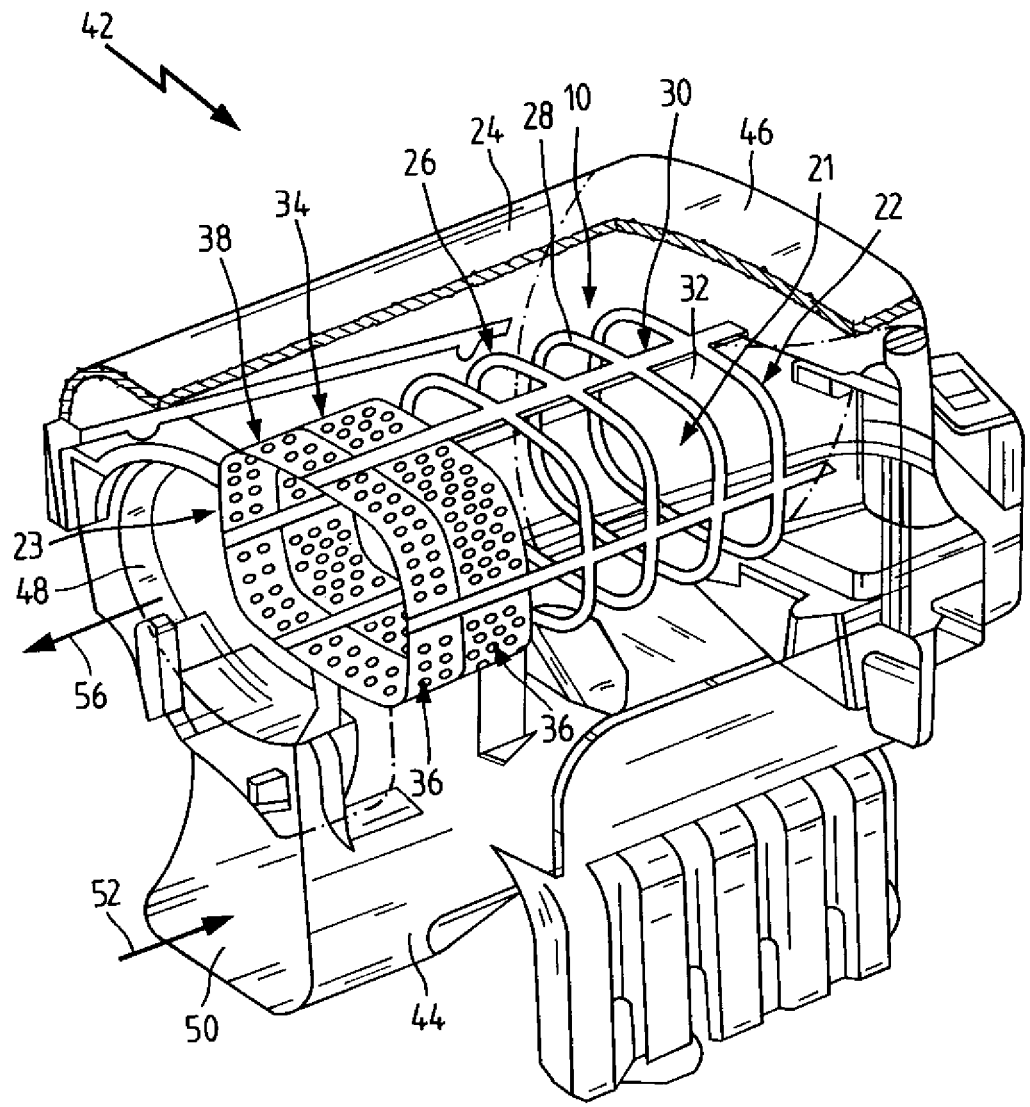
FIG. 2 shows an air filter of the internal combustion element with the filter element of FIG. 1, wherein the air filter housing of the air filter is shown as a transparent housing.

The filter medium 12 is arranged on a coaxial support tube 22. The support tube 22 extends between the two end disks 16 and 18 in the interior 21. It is connected at its outlet end 23 with the outlet end disk 16 and at the opposite end with the second end disk 18. An inner diameter of the support tube 22 corresponds approximately to a diameter of the outlet opening 20. The support tube 22 serves inter alia for shaping and supporting the filter medium 12. Moreover, the support tube 22 serves for connecting the filter element 10 with the filter housing 24 that is illustrated in FIG. 2.

The support tube 22 has a support structure 26. The support structure 26 comprises seven support rings 28 that are coaxial to the filter medium 12 and are connected monolithically by four circumferentially distributed axial support webs 30. The support rings 28 have, as shown in FIG. 2, a square profile or contour with rounded edges. The support structure 26 defines a circumferential or peripheral wall of the support tube 22. Between the first six support rings 28, counted by beginning at the second end disk 18, and the sections of the support webs 30 provided thereat, passages or openings of the support structure 26 are realized that form through openings according to a first configuration (first through openings 32) for clean air. There are sixteen through openings 32 that have the same size. The passages or openings between the fifth and sixth support rings 28 are each covered by a perforated grid or hole screen according to a first configuration (first screens 34). A total of four such first screens 34 are provided. The first screens 34 are curved in accordance with the curved structure of the support rings 28 in circumferential direction.

Each of the first screens 34 has a plurality of passages or through openings according to a second configuration (second through openings 36) for the clean air; these openings 36 are distributed uniformly across the first screen 34. The second through openings 36 have each a diameter of approximately 5 mm. They are arranged in groups of three with their centers positioned on an imaginary axial centerline which extend parallel to each other in axial direction of the support tube 22. The groups of three are displaced in axial direction relative to each other so as to be positioned alternatingly neighboring (being closer to) the fifth support ring 28 (first groups) or the sixth support ring 28 (second groups). The spacing between neighboring axial center lines is approximately 5 mm. The second through openings 36 of the first groups of three neighboring the fifth support rings 28 that correspond to each other are aligned on parallel circumferential center lines that extend continuously in circumferential direction; the through openings 36 of the second groups of three neighboring the sixth support ring 28 are aligned on parallel circumferential center lines that extend continuously in circumferential direction. The spacing between neighboring circumferential center lines is 3 mm.

The total circumferential surface area of the second through openings 36 is the sum of their individual surface areas. The total circumferential surface area of the second through openings 36 of all first screens 34 is smaller than the total circumferential surface area of first through openings 32 between the fourth and fifth support rings 28, which is the sum of the individual surface areas of the four first through openings 32.

The extensions of the openings of the support structure 26 between the sixth and the seventh support ring 28 in axial direction are smaller than the extensions of the openings between the first five support rings 28 in axial direction (counting from the end disk 18).

The openings between the sixth support ring 28 and the seventh support ring 28 are each covered by a perforated grid or hole screen according to a second configuration (second screen 38). The second screens 38 are also curved in circumferential direction in accordance with the curvature of the support rings 28. The second screens 38 have similar to the first screens 36 through openings 36. The second through openings 36 in the second screens 38 are however arranged in pairs along two parallel circumferential center lines. In case of the second screens 38, the spacings of neighboring second through openings 36 on the circumferential center lines is 7 mm. The spacing between an outlet edge of the second screen 38 and the neighboring circumferential center line is 7.5 mm. The spacing between the circumferential center lines is 6 mm.

The first through openings 32 are significantly larger than the second through openings 36. The size of the through openings thus decreases axially toward the outlet end 23 of the support tube 22. The density, i.e., the number per surface area, of the second through openings 36 in the first screen 34 is greater than the density of the second through openings 36 in the second screen 38 so that the density in axial direction to the outlet end 23 of the support tube 22 decreases. The total circumferential surface area of the second through openings 36 per axial length in the second screens 38 is smaller than the total circumferential surface area of the second through openings 36 per axial length in the first screens 34. As a whole, the through openings 32 and 36 are distributed almost across the entire axial extension of the support tube 22. A ratio of the total circumferential surface area of the through openings 32 and of the through openings 36 relative to a wall surface of the circumferential wall defined by the support structure 26 of the support tube 22 decreases toward the outlet end 23 of the support tube 22. The clean air flows, as indicated in FIG. 1 by the arrows 40, in the interior 21 to the outlet end 23 of the support tube 22. The total permeable area of the through openings 32 and 36 decreases thus in the flow direction 40 of the clean air in the interior of the support tube 22.

FIG. 2 shows an air filter 42 for filtering the intake air of an internal combustion engine. The air filter 42 comprises a filter housing 24 with a base member 44 and a removable cover 46. In the filter housing 24 the filter element 10 of FIG. 1 is arranged so as to be exchangeable such that the outlet opening 20 communicates with a clean air outlet 48 of the filter housing 24. For simplifying the illustration, in FIG. 2 the filter housing 24 is shown to be transparent. The filter medium 12 and the end disks 16 and 18 of the filter element 10 are omitted in the illustration for reasons of clarity so that only the support tube 22 can be seen.

The base member 44 has a raw air inlet 50 that is located at the same side as the clean air outlet 48. The intake air (raw air) to be filtered passes according to arrow 52 through the raw air inlet 50 into the interior of the filter housing 24. Here the raw air flows through the filter medium 12, indicated in FIG. 1 by arrows 54, from the exterior to the interior in radial direction. The clean air passes through the first through openings 32 and the second through openings 36 into the interior 21 of the filter element 10. By means of the screens 34 and 38 it is achieved that the raw air is distributed uniformly across the entire filter medium 12. Moreover, the flow of clean air in the interior 21 and through the clean air outlet 48 is improved. The clean air flows in the direction of arrow 56 out of the interior 21 through the clean air outlet 48 out of the filter housing 24.

Figure 3:
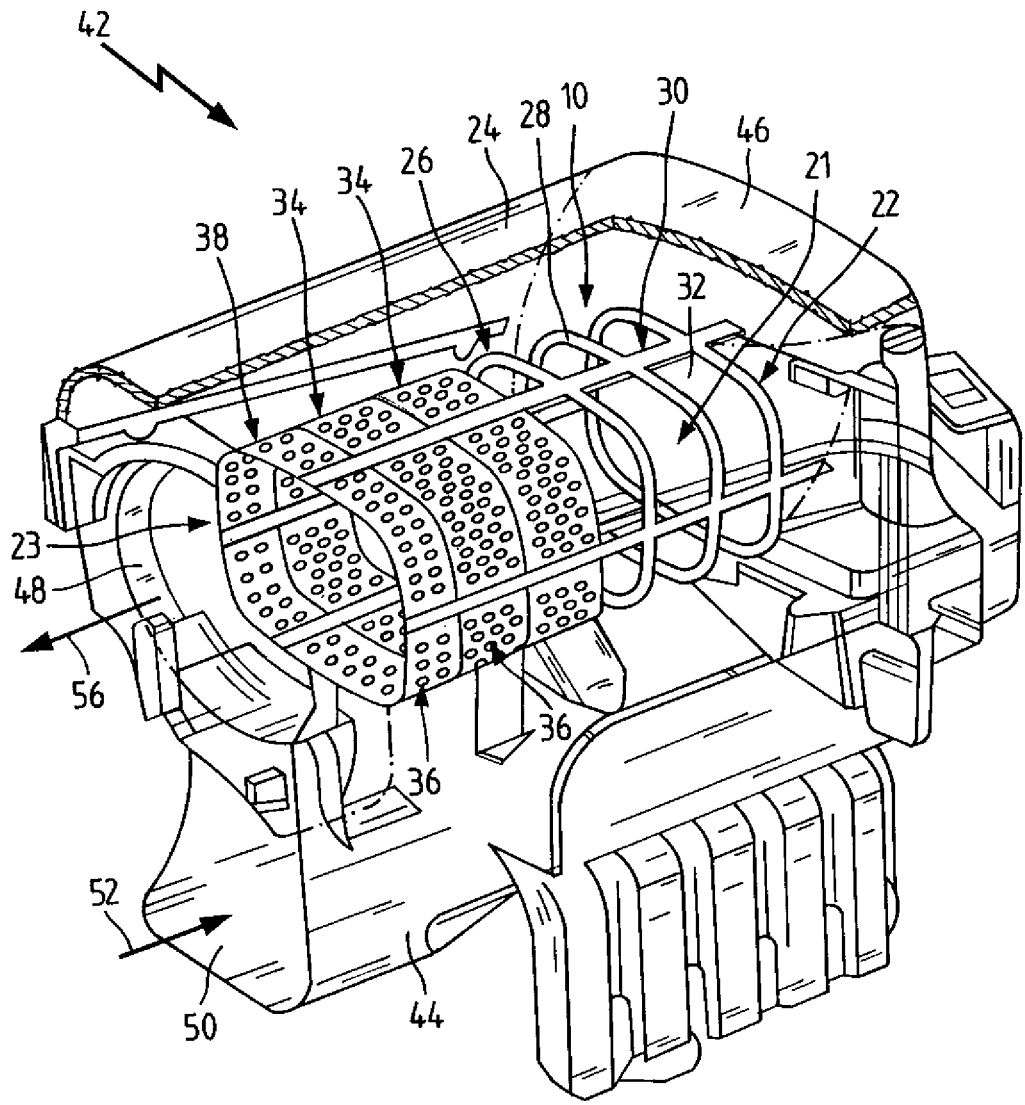
FIG. 3 shows the air filter of FIG. 2 with a filter element according to a second embodiment that is similar to the filter element of FIG. 1.

In FIG. 3, the air filter 42 is illustrated with a filter element 10 according to a second embodiment. Those elements that are similar to those of the first embodiment of FIG. 1 are identified with the same reference characters.

The second embodiment differs from the first embodiment in that in addition the openings of the support structure 26 between the fourth support ring 28, counted from the end of the support tube that is facing away from the clean air outlet 48, and the fifth support ring 28 are covered by first screens 34 with the second through openings 36. In this way, the air flow through the filter medium 12, in the interior 21, and through the clean air outlet 48 is further improved.

In all of the above described embodiments of a filter element 10, the following modifications are possible inter alia.

The invention is not limited to filter elements 10 for filtering intake air of internal combustion engines of motor vehicles. Instead, it can also be used in filter elements of different internal combustion engines, for example, industrial motors. The invention can be used also in filter elements for filtering other kinds of fluids, for example, oil, fuel, water or other gasses.

The filter elements 10 instead of having a hollow-cylindrical shape, can also have a different shape, for example, a conical shape. The support tube 22, in particular the support rings 28, can also be provided with a different, for example, a round or oval profile (contour) instead of an approximately square profile.

The filter medium 12, instead of being made of filter paper, can also be made of a different kind of material, for example, filter nonwovens.

The filter medium 12, instead of being folded in a zigzag shape, can also be folded in a different way to have an elongate and hollow shape, for example, it can be conically shaped.

Instead of the screens 34, 38, also other types of covers for the openings of the support structure 26 can be provided.

The support tube 22, instead of being a support structure 26, can also be designed in a different way. For example, the support tube 22 can have a closed circumferential wall that is provided with corresponding through openings whose total circumferential surface area decreases toward one end.

Instead of being provided with the same through openings, the first screen 34 and the second screen 38 can also have different through openings arranged therein that differ with respect to shape and/or size.

The through openings can be variably designed with regard to size and/or arrangement within each screen 34, 38.

The diameter of the second through openings 36 can also be smaller or larger than 5 mm.

In the first screen 34 the spacings between the axial center lines of the second through openings 36 can also be larger or smaller than 5 mm. The spacings between the circumferential center lines of the second through openings 36 can also the larger or smaller than 3 mm.

In the second screen 38 the spacings between the circumferential center lines can also be larger or smaller than 6 mm. The spacings between neighboring second through openings 36 on a circumferential center line can also be larger or smaller than 7 mm.

The passages can also be adapted in a different way in regard to size and/or distribution to a fluidic configuration of the filter element 10, for example to a shape, a dimension, and/or material of the filter medium 12 and/or the inflow at the filter medium 12, in such a way that non-uniform fluid flows existing upstream of the support tube can be compensated.

It is also possible to provide only a portion of the support tube with passages circumferentially and/or in axial direction.

Instead of decreasing toward one end of the support tube 22, the total circumferential surface area of the passages can also vary in a different way in the axial direction.

The total surface area of the passages can also vary in circumferential direction.

While specific embodiments of the invention have been shown and described in detail to illustrate the inventive principles, it will be understood that the invention may be embodied otherwise without departing from such principles.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:

1. A filter element for filtering fluids, the filter element comprising:
   an axially elongated support tube having
      a first axial end;
      an opposing second axial end;
      a circumferential wall extending between the first and second axial ends, the circumferential wall provided with flow passages for a fluid;
   a hollow elongate filter medium that is arranged axially on said support tube;
   wherein said passages are adapted in regard to size; distribution; or size and distribution to a fluidic configuration of said filter element such that non-uniform fluid flows that exist in operation of the filter element upstream of said support tube are compensated;
   wherein the passages are distributed almost across an entire axial length of the support tube;
   wherein said passage extend radially through the circumferential wall of the support tube;
   wherein wall surface of said circumferential wall surrounding said passages is impermeable to the fluid;
   wherein a ratio of total circumferential opening area of the passages relative to total circumferential surface area of the impermeable wall surface that surrounds the passages decreases progressively from the first end to the second end of the support tube;
   wherein the total circumferential surface area of the impermeable wall surface that surrounds the passages increases progressively from the first end to the second end of the support tube.

2. The filter element according to claim 1, wherein a density or a size of said passages decrease progressively from the first axial end to the second axial end of said support tube.

3. The filter element according to claim 1, wherein a density of said passages decrease toward said second end of said support tube.

4. The filter element according to claim 1, wherein a size of said passages decrease progressively from the first axial end to the second axial end of said support tube.

5. The filter element according to claim 1, wherein a total circumferential surface area of said passages decreases in a direction of flow of the fluid within an interior of said support tube.

6. The filter element according to claim 1, wherein said support tube is comprised of a support structure comprising a plurality of axial spaced coaxial support rings; and axial support webs that connect said support rings with each other.

7. The filter element according to claim 6, wherein
   at said second axial end, openings are provided between two of said support rings that neighbor each other,
   wherein the support tube has a cover secured directly onto the support tube and covering openings between neighboring support rings;
   wherein the fluid flow passages include radial through openings provided on and extending radially through the cover.

8. The filter element according to claim 7, wherein said cover is a hole screen.

9. The filter element according to claim 7, wherein in an axial direction of said support tube at least two of said cover are arranged.

10. The filter element according to claim 1 embodied to filter intake air of an internal combustion engine.

11. An air filter of an internal combustion engine, the air filter comprising:
 a filter housing;
 a filter element arranged in said filter housing,
 wherein said filter element comprises
  a support tube having
   a first axial end;
   an opposing second axial end;
   a circumferential wall extending between the first and second axial ends, the circumferential wall provided with flow passages for a fluid; and
  a hollow elongate filter medium that is arranged axially on said support tube;
 wherein said passages are distributed almost across an entire axial length of said support tube; and
 wherein a ratio of a total circumferential surface area of said passages to a total circumferential surface area of a wall surface of said support tube, said wall surface surrounding said passages and being impermeable to the fluid, decreases progressively from the first end toward the second end of said support tube.

* * * * *